(12) United States Patent
Suwa

(10) Patent No.: US 11,820,615 B2
(45) Date of Patent: Nov. 21, 2023

(54) SHEET CONVEYANCE APPARATUS, IMAGE READING APPARATUS AND IMAGE FORMING APPARATUS

(71) Applicant: CANON KABUSHIKI KAISHA, Tokyo (JP)

(72) Inventor: Junichi Suwa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/979,823

(22) Filed: Nov. 3, 2022

(65) Prior Publication Data
US 2023/0051220 A1 Feb. 16, 2023

Related U.S. Application Data

(63) Continuation of application No. 17/320,681, filed on May 14, 2021, now Pat. No. 11,530,101.

(30) Foreign Application Priority Data

May 27, 2020 (JP) ................................. 2020-092282

(51) Int. Cl.
*B65H 1/14* (2006.01)
*B65H 3/06* (2006.01)
*H04N 1/00* (2006.01)

(52) U.S. Cl.
CPC ............. *B65H 1/14* (2013.01); *B65H 3/0669* (2013.01); *H04N 1/00408* (2013.01);
(Continued)

(58) Field of Classification Search
CPC ............. B65H 2801/27; B65H 29/125; B65H 2220/01; B65H 2801/06; B65H 2511/20; B65H 37/04; B65H 2220/02; B65H 31/34; B65H 2701/131; B65H 2511/10; B65H 2511/414; B65H 31/3027; B65H 7/06;
(Continued)

(56) References Cited

U.S. PATENT DOCUMENTS 6,091,927 A * 7/2000 Hattori ................... G03G 15/60
271/127
7,267,335 B2 9/2007 Kubo
(Continued)

FOREIGN PATENT DOCUMENTS

JP 2001-350225 A 12/2001
JP 2005-263452 A 9/2005

*Primary Examiner* — Negussie Worku
(74) *Attorney, Agent, or Firm* — VENABLE LLP

(57) ABSTRACT

In a sheet conveyance apparatus a control unit controls lifting and lowering of a sheet supporting portion by a lifting unit and executes a mixed feeding in one of a plurality of modes including a first mode and a second mode. The mixed feeding is an operation in which a plurality of sheets having different lengths in a width direction orthogonal to a feed direction of a sheet feeding unit are fed by the feeding unit, wherein in the first mode, the control unit causes the lifting unit to move the supporting portion from the second position to the first position based on an instruction to start sheet feeding, and in the second mode, the control unit causes the lifting unit to move the supporting portion from the second position to the first position based on a detection of a sheet by the detection unit.

12 Claims, 13 Drawing Sheets

(52) U.S. Cl.
CPC ..... *H04N 1/00588* (2013.01); *H04N 1/00615* (2013.01); *H04N 1/00708* (2013.01); *H04N 1/00787* (2013.01); *H04N 2201/0081* (2013.01); *H04N 2201/0082* (2013.01)

(58) Field of Classification Search
CPC .......... B65H 43/00; B65H 2301/33312; B65H 2301/42262; B65H 2404/632; B65H 2511/11; B65H 2511/15; B65H 2513/51; B65H 2515/10; B65H 85/00; B65H 2301/4219; B65H 2511/22; B65H 3/48; B65H 2220/03; B65H 2220/11; B65H 2301/42266; B65H 2405/332; B65H 2601/11; B65H 29/60; B65H 31/24; B65H 31/3081; B65H 1/14; B65H 2301/42194; B65H 2404/1422; B65H 2404/1424; B65H 2511/13; B65H 2511/51; B65H 43/08; B65H 2220/04; B65H 2301/3613; B65H 2301/3621; B65H 2301/4231; B65H 2404/741; B65H 2513/40; B65H 3/042; B65H 3/06; B65H 3/0669; B65H 3/126; B65H 31/10; B65H 31/26; B65H 43/04; B65H 9/06; B65H 1/08; B65H 2301/422; B65H 2513/10; B65H 2801/39; B65H 31/04; B65H 7/02; B65H 2301/4222; B65H 2301/4318; B65H 2301/4381; B65H 2301/43825; B65H 2404/1114; B65H 2404/693; B65H 2511/52; B65H 2511/528; B65H 2551/18; B65H 2801/48; B65H 29/12; B65H 29/14; B65H 29/52; B65H 31/36; B65H 39/10; B65H 5/062; B65H 1/04; B65H 2220/09; B65H 2405/20; B65H 2406/121; B65H 2511/16; B65H 2511/30; B65H 2515/20; B65H 2515/34; B65H 2553/41; B65H 2801/03; B65H 29/00; B65H 3/02; B65H 3/08; B65H 37/06; B65H 45/144; B65H 45/148; B65H 7/16; B65H 7/20; B65H 1/266; B65H 2301/333; B65H 2301/4227; B65H 2402/10; B65H 2403/942; B65H 2404/14; B65H 2404/265; B65H 2404/612; B65H 2404/622; B65H 2404/732; B65H 2405/11; B65H 2405/11151; B65H 2408/12; B65H 2408/121; B65H 2511/212; B65H 2511/515; B65H 2513/42; B65H 2513/512; B65H 2515/81; B65H 2701/19; B65H 29/70; B65H 3/0661; B65H 3/0684; B65H 3/52; B65H 3/5215; B65H 3/5223; B65H 3/5261; B65H 3/565; B65H 3/66; B65H 31/20; B65H 31/38; B65H 33/08; B65H 35/0006; B65H 39/11; B65H 45/18; B65H 5/06; B65H 5/26; B65H 7/00; B65H 7/04; B65H 1/06; B65H 2301/51214; B65H 2405/1113; B65H 2405/1117; B65H 2405/11172; B65H 2405/113; B65H 2405/1136; B65H 2405/114; B65H 2405/324; B65H 2407/21; B65H 2408/112; B65H 2408/113; B65H 2511/23; B65H 2511/415; B65H 2551/20; B65H 2701/1131; B65H 29/6609; B65H 3/0607; B65H 3/0615; B65H 3/68; B65H 31/28; B65H 33/16; B65H 45/14; G03G 15/6541; G03G 15/70; G03G 15/234; G03G 15/5012; G03G 2215/00827; G03G 15/60; G03G 15/6573; G03G 15/502; G03G 15/50; G03G 15/6505; G03G 15/6538; G03G 15/6552; G03G 15/0194; G03G 15/6582; G03G 2215/00421; G03G 2215/0089; G03G 2215/00936; G03G 2215/0106; G03G 2215/0129; G03G 15/6544; G03G 15/5016; G03G 15/5083; G03G 15/5087; G03G 15/6558; G03G 21/206; G03G 2215/00109; G03G 2215/00552; G03G 2215/00556; G03G 2215/00586; G03G 2221/1645; G03G 15/602; G03G 2215/00426; G03G 2215/00447; G03G 2215/00877; G03G 15/0131; G03G 15/0283; G03G 15/166; G03G 15/168; G03G 15/605; G03G 15/65; G03G 15/6508; G03G 15/6523; G03G 15/6529; G03G 15/6564; G03G 15/6567; G03G 15/80; G03G 21/00; G03G 21/1604; G03G 21/1638; G03G 21/168; G03G 2215/00185; G03G 2215/00202; G03G 2215/00215; G03G 2215/00227; G03G 2215/00438; G03G 2215/0054; G03G 2215/00544; G03G 2215/00675; G03G 2215/00721; G03G 2215/00983; G03G 2221/1675; G03G 2221/1696; G03G 15/00; G03G 15/0435; G03G 15/221; G03G 15/23; G03G 15/5029; G03G 15/5062; G03G 15/507; G03G 15/55; G03G 15/607; G03G 15/655; G03G 21/0035; G03G 21/02; G03G 2215/0021; G03G 2215/00236; G03G 2215/00282; G03G 2215/00329; G03G 2215/00569; G03G 2215/00734; G03G 2215/00869; G03G 2221/1654; H04N 1/00588; H04N 2201/0081; H04N 2201/0082; H04N 1/00408; H04N 1/00615; H04N 1/00708; H04N 1/00787; H04N 1/00567; H04N 1/00633; H04N 1/1017; H04N 1/193; H04N 1/32496; H04N 2201/0434; H04N 1/00204; H04N 1/00525; H04N 1/00533; H04N 1/00591; H04N 1/00602; H04N 1/00623; H04N 1/00639; H04N 1/00795; H04N 1/00827; H04N 1/00832; H04N 1/02875; H04N 1/04; H04N 1/32122; H04N 1/32358; H04N 1/3247; H04N 1/32561; H04N 2201/0086; H04N 2201/0091; H04N 2201/0093; H04N 2201/0098; H04N 2201/0436; H04N 2201/046; H04N 2201/3216; H04N 2201/3274; H04N 2201/3287; G06F 15/16; G06F 3/0489
USPC ....................................................... 271/110
See application file for complete search history.

(56) References Cited

U.S. PATENT DOCUMENTS

| | | | |
|---|---|---|---|
| 7,628,395 B2 | 12/2009 | Shiga et al. | |
| 10,571,846 B2 | 2/2020 | Yoshimura | |
| 2004/0156662 A1 | 8/2004 | Fuji et al. | |
| 2010/0148420 A1* | 6/2010 | Hamano | B65H 3/0607 |
| | | | 271/3.15 |
| 2010/0225045 A1 | 9/2010 | Kumra et al. | |
| 2013/0236227 A1 | 9/2013 | Hirako | |

(56) References Cited

U.S. PATENT DOCUMENTS

| | | | |
|---|---|---|---|
| 2014/0061991 A1* | 3/2014 | Shimura | B65H 31/3027 |
| | | | 270/58.08 |
| 2014/0355083 A1 | 12/2014 | Omoya | |
| 2016/0185133 A1* | 6/2016 | Asada | B41J 11/0045 |
| | | | 347/104 |
| 2017/0108813 A1* | 4/2017 | Sato | G03G 15/6514 |
| 2019/0068823 A1 | 2/2019 | Ito | |
| 2020/0192266 A1 | 6/2020 | Yoshimura | |
| 2020/0385225 A1* | 12/2020 | Mitamura | B65H 7/02 |
| 2021/0171299 A1* | 6/2021 | Mizumukai | B65H 1/08 |
| 2021/0245979 A1* | 8/2021 | Hamada | H04N 1/00652 |
| 2021/0371220 A1* | 12/2021 | Suwa | B65H 3/06 |
| 2022/0002099 A1* | 1/2022 | Kao | B65H 31/02 |
| 2022/0021777 A1* | 1/2022 | Totsuka | B65H 3/0669 |
| 2022/0043385 A1* | 2/2022 | Furukawa | G03G 15/6552 |

* cited by examiner

SHEET CONVEYANCE APPARATUS, IMAGE READING APPARATUS AND IMAGE FORMING APPARATUS

This application is a continuation of application Ser. No. 17/320,681, filed May 14, 2021.

BACKGROUND OF THE INVENTION

Field of the Invention

The present invention relates to a sheet conveyance apparatus configured to convey a sheet, an image reading apparatus configured to read image information from the sheet and an image forming apparatus configured to form an image on a recording material.

Description of the Related Art

An image reading apparatus provided with an automatic document feeder (referred to as an ADF hereinafter) configured to automatically feed sheets set on a tray one by one is widely used to read image information from the sheets serving as documents.

U.S. Pat. No. 10,571,846 describes an ADF that stands by without lifting a document tray even if the ADF detects that documents are stacked on the document tray by a sensor thereof in a case where a mixed stacking mode by which a plurality of sheets having different sizes is fed is selected.

Such ADFs capable of feeding mixed size documents like U.S. Pat. No. 10,571,846 conventionally assume that documents to be fed have relatively close sizes with each other among standard sizes such as A4 and B5, i.e., sheet sizes established by the standard such as ISO 216 and Japanese Industrial Standard JIS P0138. However, in addition to the standard size documents, there is a need to automatically read image information from mixed size documents in which non-standard size documents are stacked together with the standard size documents. The non-standard size refers to a sheet size that does not match any of the standard sizes, and is a receipt or a check for example.

In a case of setting mixed size documents including non-standard size documents, the documents often need to be repositioned as compared to a case of setting mixed size documents including only the standard sizes, because difference in sizes of the documents may be large in the case of setting mixed size documents including non-standard size. Inversely, it is less likely that the documents need to be repositioned in the case of setting mixed size documents including only the standard sizes as compared to the case of setting mixed size documents including non-standard size. However, according to U.S. Pat. No. 10,571,846, the ADF stands by uniformly without lifting the document tray until receiving an instruction to start a reading operation in the mixed stacking mode. Therefore, it is desired to improve a control of lifting and lowering the document tray in the mixed stacking mode.

SUMMARY OF THE INVENTION

The present invention provides a sheet conveyance apparatus, an image reading apparatus, and an image forming apparatus with an improved control of lifting and lowering of a supporting portion on which mixed size sheets are supported.

According to one aspect of the invention, a sheet conveyance apparatus includes a supporting portion configured to support a sheet, a detection unit configured to detect a sheet supported on the supporting portion, a feeding unit disposed above the supporting portion and configured to feed a sheet supported on the supporting portion, a lifting unit configured to lift and lower the supporting portion between a first position to feed a sheet by the feeding unit and a second position below the first position, and a control unit configured to control lifting and lowering of the supporting portion by the lifting unit. The control unit is capable of selectively executing a first mode and a second mode, the first mode being a mode in which a plurality of sheets supported on the supporting portion and having different sizes including a non-standard size are fed by the feeding unit, the second mode being a mode in which a plurality of sheets supported on the supporting portion and having different sizes including only standard sizes are fed by the feeding unit. If the detection unit detects a sheet in a state where the supporting portion is located at the second position and the first mode is selected, the control unit waits for an instruction to start sheet feeding without causing the lifting unit to lift the supporting portion to the first position, and causes the lifting unit to lift the supporting portion to the first position in response to the instruction to start sheet feeding. If the detection unit detects a sheet in a state where the supporting portion is located at the second position and the second mode is selected, the control unit causes the lifting unit to lift the supporting portion to the first position and waits for the instruction to start sheet feeding.

According to another aspect of the invention, an image reading apparatus includes a supporting portion configured to support a sheet, a detection unit configured to detect a sheet supported on the supporting portion, a feeding unit disposed above the supporting portion and configured to feed a sheet supported on the supporting portion, a lifting unit configured to lift and lower the supporting portion between a first position to feed a sheet by the feeding unit and a second position below the first position, a control unit configured to control lifting and lowering of the supporting portion by the lifting unit, and a reading portion configured to read image information from a sheet fed by the feeding unit. The control unit is capable of selectively executing a first mode and a second mode, the first mode being a mode in which a plurality of sheets supported on the supporting portion and having different sizes including a non-standard size are read by the reading portion, the second mode being a mode in which a plurality of sheets supported on the supporting portion and having different sizes including only standard sizes are read by the reading portion. If the detection unit detects a sheet in a state where the supporting portion is located at the second position and the first mode is selected, the control unit waits for an instruction to start sheet reading without causing the lifting unit to lift the supporting portion to the first position, and causes the lifting unit to lift the supporting portion to the first position in response to the instruction to start sheet reading. If the detection unit detects a sheet in a state where the supporting portion is located at the second position and the second mode is selected, the control unit causes the lifting unit to lift the supporting portion to the first position and waits for the instruction to start sheet reading.

According to still another aspect of the invention, an image forming apparatus includes a supporting portion configured to support a sheet, a detection unit configured to detect a sheet supported on the supporting portion, a feeding unit disposed above the supporting portion and configured to feed a sheet supported on the supporting portion, a lifting unit configured to lift and lower the supporting portion between a first position to feed a sheet by the feeding unit and a second position below the first position, a control unit configured to control lifting and lowering of the supporting portion by the lifting unit, a reading portion configured to read image information from a sheet fed by the feeding unit, and an image forming portion configured to form an image on a recording material based on the image information read by the reading portion. The control unit is capable of selectively executing a first mode and a second mode, the first mode being a mode in which a plurality of sheets supported on the supporting portion and having different sizes including a non-standard size are read by the reading portion, the second mode being a mode in which a plurality of sheets supported on the supporting portion and having different sizes including only standard sizes are read by the reading portion. If the detection unit detects a sheet in a state where the supporting portion is located at the second position and the first mode is selected, the control unit waits for an instruction to start sheet reading without causing the lifting unit to lift the supporting portion to the first position, and causes the lifting unit to lift the supporting portion to the first position in response to the instruction to start sheet reading. If the detection unit detects a sheet in a state where the supporting portion is located at the second position and the second mode is selected, the control unit causes the lifting unit to lift the supporting portion to the first position and waits for the instruction to start sheet reading.

Further features of the present invention will become apparent from the following description of exemplary embodiments with reference to the attached drawings.

DESCRIPTION OF THE EMBODIMENTS

Embodiments of the present disclosure will be described below with reference to the drawings.

First Embodiment

Figure 3:
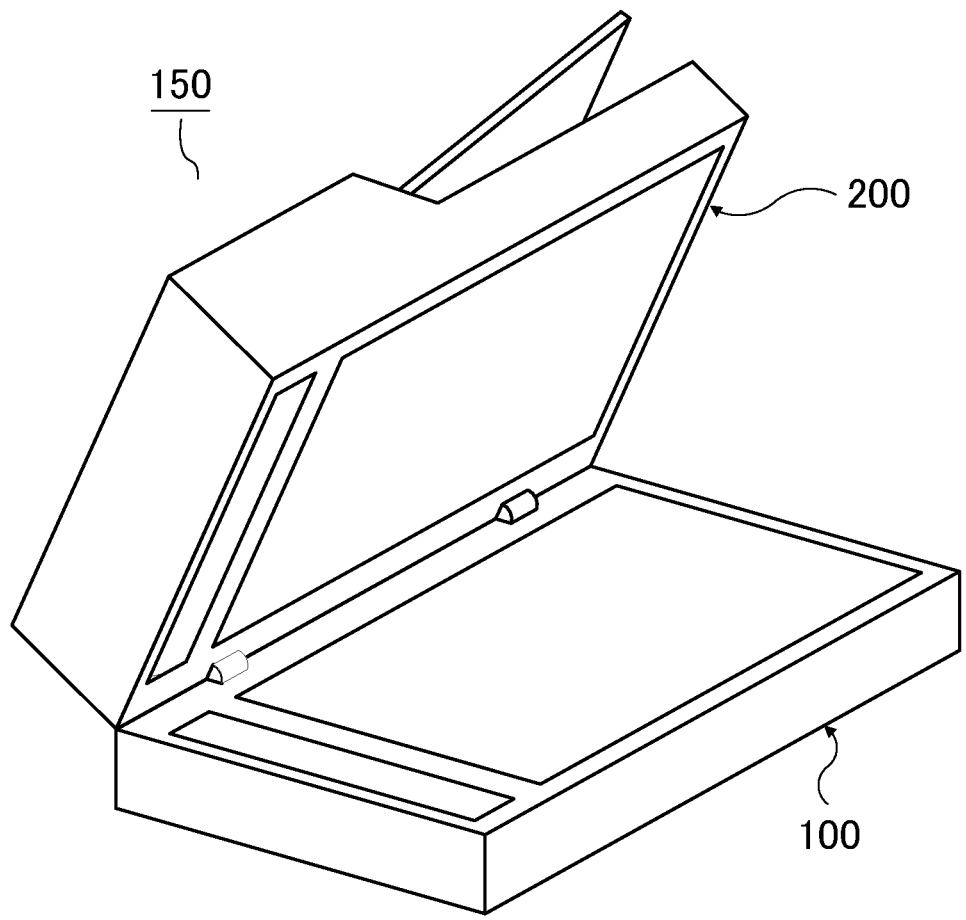
FIG. 3 is a perspective view of an image reading apparatus according to a first embodiment.

FIG. 3 is a perspective view illustrating an image reading apparatus 150 according to a first embodiment. The image reading apparatus 150 of the present embodiment is composed of a reader portion 100 configured to read image information from a document and an ADF 200 configured to convey the document to a reading position where the reader portion 100 reads the document. The ADF 200 serves as a sheet conveyance apparatus of the present embodiment. The ADF 200 is supported by and openable with respect to the reader portion 100 by an opening hinge not illustrated and provided at a rear side of an upper surface of the reader portion 100.

The image reading apparatus 150 is able to execute two kinds of operations of a document fixed reading operation and a feeding reading operation as reading operations of reading image information from the document. The document fixed reading operation is an operation of reading image information from a still document placed on a platen glass 101 of the reader portion 100, and the feeding reading is an operation of reading image information while feeding documents one by one by the ADF 200.

Reader Portion

Figure 4A:
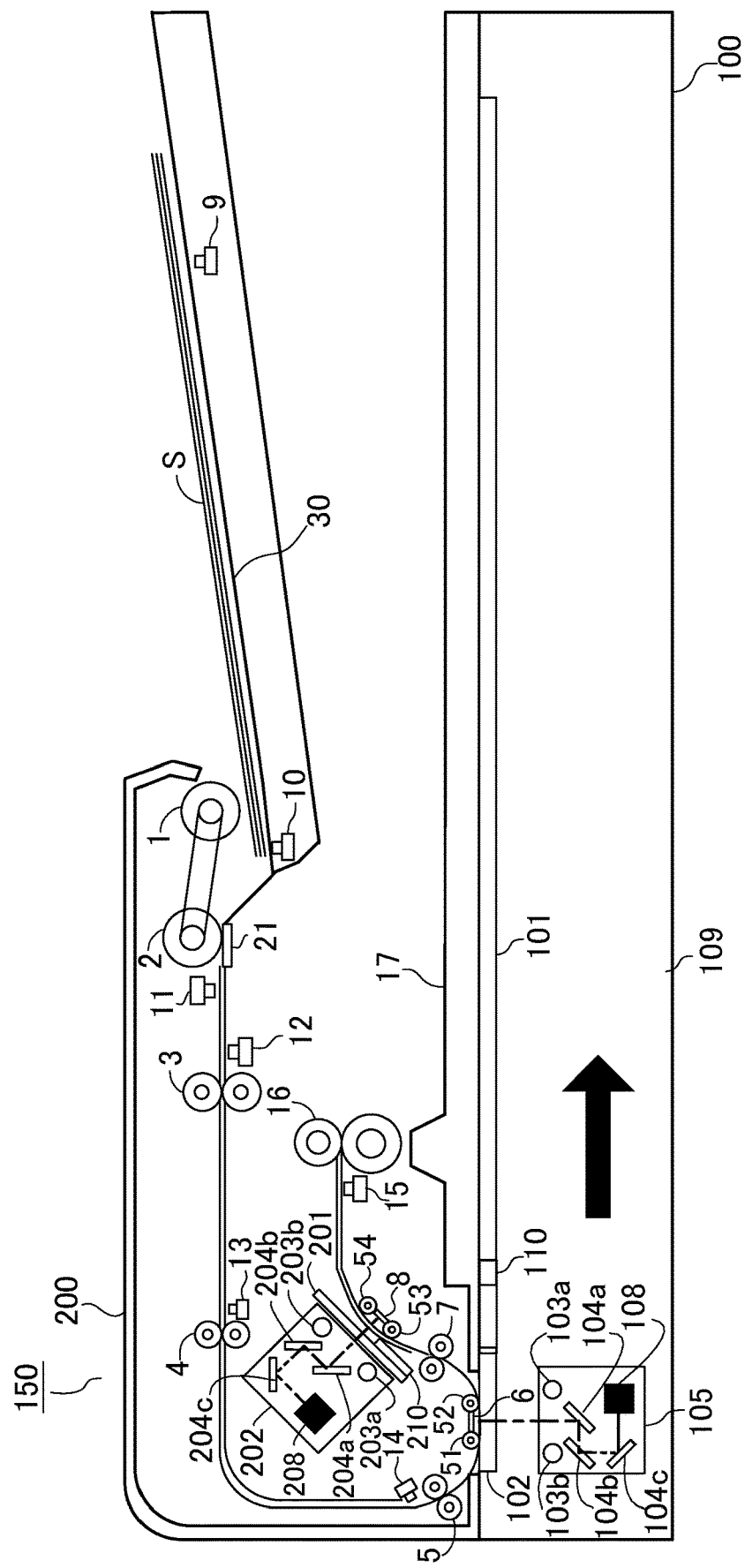
FIG. 4A is a section view of an ADF according to the first embodiment.

The reader portion 100 will be described below with reference to FIG. 4A. FIG. 4A is a section view illustrating a schematic configuration of the image reading apparatus 150 of the present embodiment.

The reader portion 100 includes the platen glass 101, a front reading glass 102, a front surface reading portion 105, an optical motor 306 not illustrated (see FIG. 5), and a read moving guide 109. The front surface reading portion 105 is a line sensor unit including front LEDs 103a and 103b which are light sources, a front reading sensor 108 which is an image sensor such as a charge coupled device, and a plurality of mirrors 104a, 104b and 104c. The front surface reading portion 105 is supported by a carriage driven by the optical motor 306 and is reciprocally movable in a horizontal direction in FIG. 4A.

In a case of the document fixed reading operation, the front surface reading portion 105 reads image information of the document by one line each by scanning the document on the platen glass 101 while moving under the platen glass 101 by being driven by the optical motor 306. In a case of the feeding reading operation, the front surface reading portion 105 reads image information of one surface of the document by one line each by scanning the document conveyed by the ADF 200 through the front reading glass 102.

The ADF 200 will be described with reference to FIG. 4A. The ADF 200 includes a document tray 30, a feed roller 1, a separation roller 2, a separation pad 21, a document presence/absence sensor 10, and an on-tray length sensor 9.

The document tray 30 is a supporting portion of the present embodiment on which sheets to be used as documents are stacked. Note that various sheets having different sizes and materials such as a plain paper and a thick paper, a plastic film, cloth, a surface treated sheet such as a coated sheet, and a specially shaped sheet member such as an envelope and an index sheet can be used as the document.

The document tray 30 is configured such that at least a part thereof is liftable by a tray lifting motor 312 in FIG. 5 as described later. For instance, the document tray 30 is configured such that a downstream part of the document tray 30 in a feed direction of the document, i.e., in a left direction in FIG. 4A, is vertically movable with respect to a frame member of the ADF 200 and such that a lower surface thereof is supported by a lift plate linked with the tray lifting motor 312 through gears. In executing the feeding reading operation, the document tray 30 is lifted such that a document bundle S on the document tray 30 comes into contact with the feed roller 1 with an adequate contact pressure.

Note that the document tray 30 is provided with a pair of side regulating plates 31a and 31b (see FIG. 1A) serving as a pair of regulating members configured to regulate a document position in a width direction orthogonal to the feed direction of the document. The side regulating plates 31a and 31b are provided to be movable in an interlocking manner in the width direction, symmetrically with respect to a center position of the feed roller 1 in the width direction as an axis of symmetry and can regulate the document positions by coming into contact with side edge portions of the documents stacked on the document tray 30.

The feed roller 1 serves as a feeding unit of the present embodiment configured to feed the sheet from the supporting portion. The feed roller 1 is disposed above the document tray 30 and is provided above a center position of the document tray 30 in the width direction (see FIG. 1A). The feed roller 1 comes into contact with the document bundle S on the document tray 30 to feed an uppermost document toward a separation roller 2 when the feeding reading operation is to be executed. The separation roller 2 and the separation pad 21 constitute an example of a mechanism for separating the documents. That is, the documents are conveyed while being separated one by one by a frictional force applied from the separation pad 21 to the document entering to a separation nip between the separation roller 2 and the separation pad 21. Note that the feed roller 1 is one example of the feeding unit and may be what delivers the document out of the document tray 30 by a belt member for example.

The document presence/absence sensor 10 is provided near a downstream end of the document tray 30 in the sheet feed direction, i.e., downstream of the contact position of the feed roller 1 in particular, and is configured to change a detection signal corresponding to whether there is a document on the document tray 30. That is, the document presence/absence sensor 10 functions as a detection unit of the present embodiment for detecting whether there is a document on the sheet supporting portion. The on-tray length sensor 9 is provided at a predetermined detecting position on the document tray 30 in the sheet feeding position and is configured to change a detection signal corresponding to whether there is a document at a detecting position. The on-tray length sensor 9 is used to discriminate a length in a conveyance direction of the document on the document tray 30. A shading type photo-electronic sensor that is shaded by a flag swung by being pressed by the document or a reflecting type photo-electronic sensor that emits detection light to an upper part of the document tray 30 and detects reflection light from the document for example may be used as the document presence/absence sensor 10 and the on-tray length sensor 9.

The ADF 200 further includes a pull-out roller 3, a conveyance roller 4, a reading upstream roller 5, a front glass counter member 6, an intermediate conveyance roller 7, a rear surface reading portion 202, a rear reading glass 201, a rear glass counter member 8, a discharge roller 16, and a discharge tray 17.

The document delivered out of the separation roller 2 is conveyed toward the reading position of the front surface reading portion 105 through the pull-out roller 3, the conveyance roller 4, and the reading upstream roller 5. At the reading position of the front surface reading portion 105, the document is conveyed while passing a gap between the front reading glass 102 and the front glass counter member 6. Simultaneously, image information of a first face, i.e., a front surface, of the document is read by the front surface reading portion 105 line by line. Reading accuracy is assured by pressing the document against the front reading glass 102 by roller members 51 and 52 provided upstream and downstream of the reading position.

The document that has passed through the reading position of the front surface reading portion 105 is conveyed toward a reading position of a rear surface reading portion 202 through an intermediate conveyance roller 7. At the reading position of the rear surface reading portion 202, the document is conveyed while passing a gap between the rear reading glass 201 and a rear glass counter member 8. Simultaneously, image information of a second face, i.e., a rear surface, of the document is read line by line by the rear surface reading portion 202. Note that the rear reading glass 201 is movable and in a case where the image information is to be read from the rear surface, the rear reading glass 201 is moved to a position as illustrated in FIG. 4A in advance before the document arrives at the reading position of the rear surface reading portion 202. Reading accuracy is assured by pressing the document against the rear reading glass 201 by roller members 53 and 54 provided upstream and downstream of the reading position.

The rear surface reading portion 202 is a line sensor unit including rear LEDs 203a and 203b serving as light sources, a rear reading sensor 208 which is an image sensor such as a charge coupled device, and a plurality of mirrors 204a, 204b and 204c. Note that both of the front surface reading portion 105 and the rear surface reading portion 202 are examples of reading portions configured to read image information and may be contact image sensors (CIS) having an equal-magnification optical system.

The document that has passed through the reading position of the rear surface reading portion 202 is discharged out of the ADF 200 by the discharge roller 16 and is stacked on the discharge tray 17. In a case where a plurality of sheets of documents is stacked on the document tray 30, the image reading apparatus 150 reads image information from each document by repeatedly executing document feeding, reading and discharging operations described above.

Note that the separation sensor 11, the pull-out sensor 12, the conveyance sensor 13, the read sensor 14, and the discharge sensor 15 are provided as conveyance system sensors for monitoring the conveyance of the document at the respective places of the conveyance path within the ADF 200 from the feed roller 1 to the discharge roller 16. A controller of the image reading apparatus 150 judges whether the conveyance of the document is normally in progress based on times of these sensors that detect passage of a leading edge or a trailing edge of the document.

Still further, while the case of reading the image information from the both surfaces of the document has been described here, the document is conveyed while passing the reading position of the rear surface reading portion 202 without being read by the rear surface reading portion 202 in a case where the image information is read only from one surface of the document.

Image Forming Apparatus

Figure 4B:
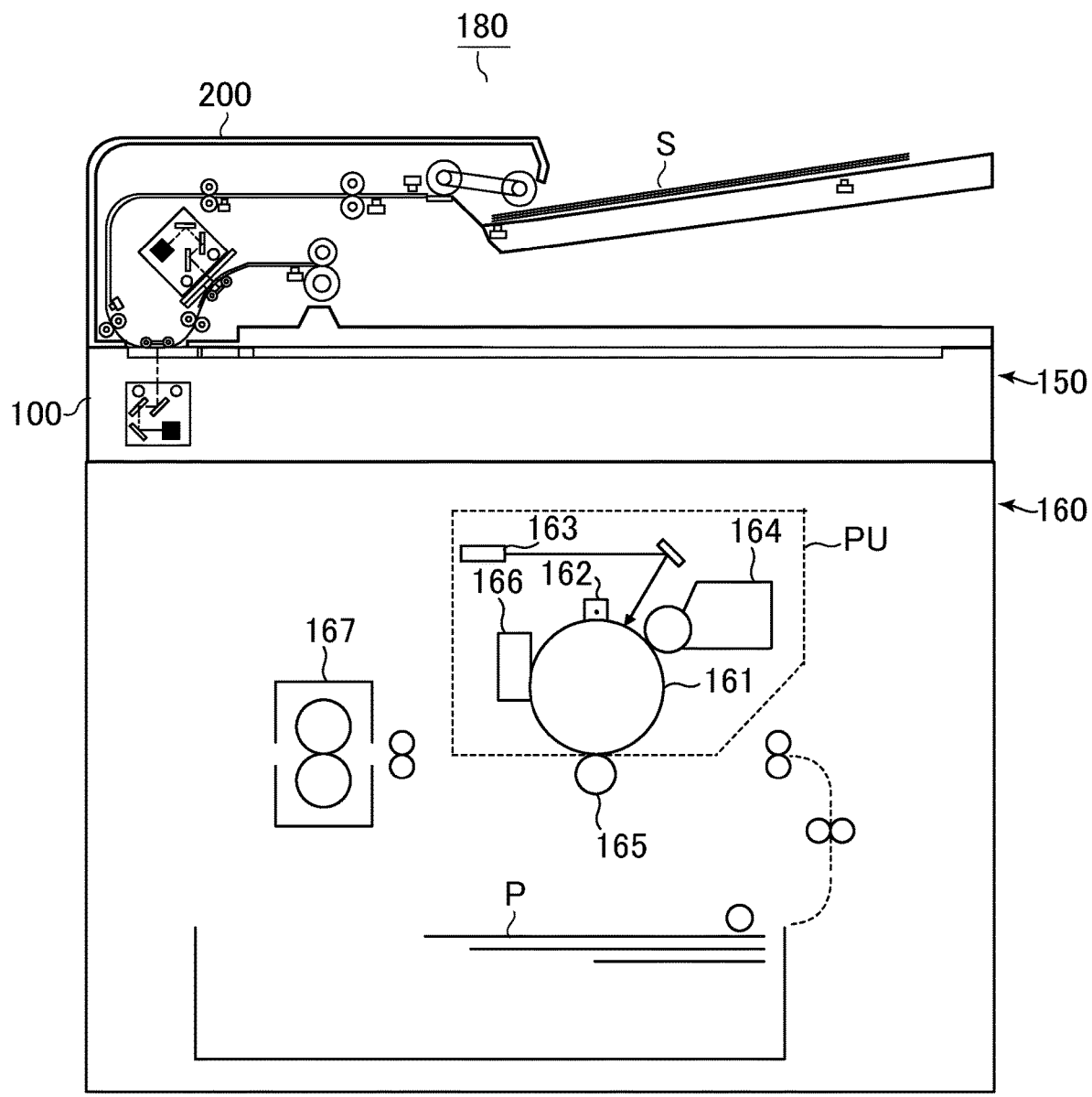
FIG. 4B is schematic diagram of an image forming apparatus according to the first embodiment.

FIG. 4B illustrates an image forming apparatus 180 in which the image reading apparatus 150 is mounted on an upper part of an image forming apparatus body 160 as one of use modes of the image reading apparatus 150. An electrophotographic image forming unit PU serving as an image forming unit is stored in the image forming apparatus body 160, and the reader portion 100 of the image reading apparatus 150 is fixed to a frame member of the image forming apparatus body 160.

The image forming apparatus 180 is capable of executing an image forming operation or a copying operation of forming an image on a recording material P based on the image information read by the image reading apparatus 150. In the image forming unit PU, a charging unit 162 homogeneously electrifies a surface of a photosensitive member 161, and an exposing unit 163 draws an electrostatic latent image on the photosensitive member 161 by irradiating the photosensitive member 161 with a laser beam modulated based on the image information. A developing unit 164 supplies developer containing electrified toner particles to the photosensitive member 161 to develop and visualize the electrostatic latent image as a toner image. A transfer unit 165 transfers the toner image borne on the photosensitive member 161 to the recording material P. A cleaning unit 166 removes adhesives such as residual toner left on the photosensitive member 161 without being transferred to the recording material P. A fixing unit 167 applies heat and pressure to the toner image on the recording material P to melt and to fix the toner image onto the recording material P.

Note that the image reading apparatus 150 can be used as an apparatus independent of the image forming apparatus body. In such a case, image information read by the image reading apparatus 150 is transferred to an external computer through network for example. FIG. 4B illustrates one example of the image forming apparatus, and an inkjet-type printing unit may be used as the image forming unit.

Control System of Image Reading Apparatus

Figure 5:
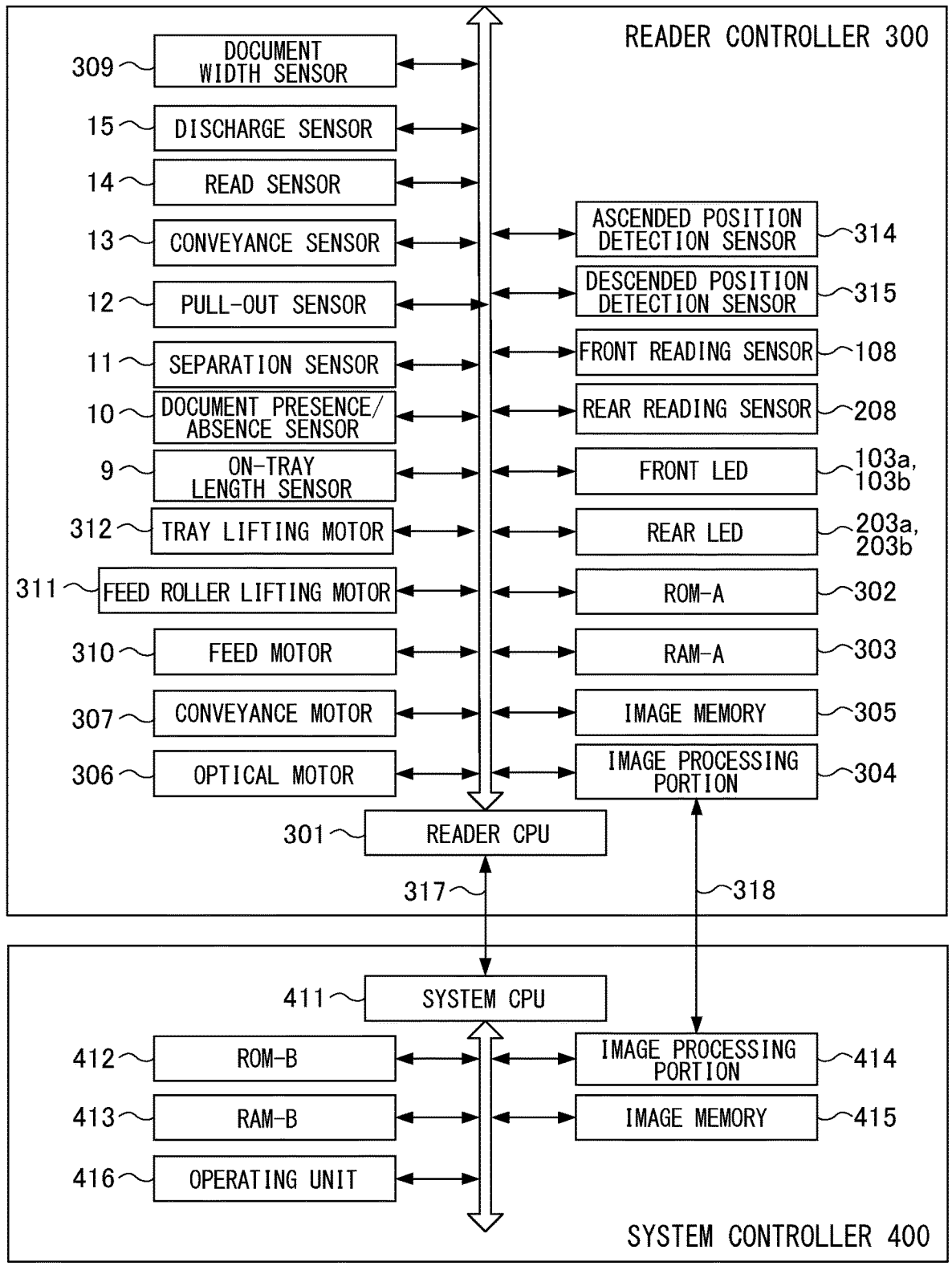
FIG. 5 is a block diagram illustrating a control system of the image reading apparatus according to the first embodiment.

FIG. 5 is a block diagram illustrating a control system of the image reading apparatus 150 according to the present embodiment. The image reading apparatus 150 includes a reader controller 300. The reader controller 300 includes a reader CPU 301 which is a central processing unit, a ROM-A 302 which is a read only memory, and a RAM-A 303 which is a random access memory. A control program is stored in the ROM-A 302, and input data and work data are stored in the RAM-A 303. The reader CPU 301 functions as a control portion controlling an operation of the image reading apparatus 150 in accordance to a flow as described later by using FIG. 10 by reading and executing the control program stored in the ROM-A 302.

The reader CPU 301 is connected with actuators of the image reading apparatus 150 including a tray lifting motor 312 serving as a lifting unit, a feed roller lifting motor 311, a feed motor 310, a conveyance motor 307 and an optical motor 306, and controls driving states of the respective motors. The tray lifting motor 312 lifts and lower the document tray 30 and serves as a lifting unit of the present embodiment. The feed roller lifting motor 311 lifts and lowers the feed roller 1 illustrated in FIG. 4A. The feed motor 310 drives the feed roller 1 and the separation roller 2. The conveyance motor 307 drives the pull-out roller 3, the conveyance roller 4, the reading upstream roller 5, the intermediate conveyance roller 7, and the discharge roller 16.

In the present embodiment, both of the feed motor 310 and the conveyance motor 307 are stepper motors, and the reader CPU 301 controls rotation of the respective motors by controlling driving pulse numbers of these motors. Therefore, the driving pulse number may be interpreted as a conveyance distance of a document being conveyed. That is, the reader CPU 301 can measure the conveyance distance of the document by counting the driving pulse number of the feed motor 310 and the conveyance motor 307.

The reader CPU 301 is connected with the document presence/absence sensor 10, the on-tray length sensor 9, and the document width sensor 309 respectively provided on the document tray 30. As for the document width sensor 309, a volume sensor provided on a pinion gear of a rack and pinion gear that interlocks the side regulating plates 31a and 31b may be used. The reader CPU 301 can assume a size of a document stacked on the document tray 30 based on a detection result of the on-tray length sensor 9 and the document width sensor 309. As for a length of the document, the reader CPU 301 can also obtain a more accurate value by using a conveyance system sensor while conveying the document.

The reader CPU 301 also includes an ascended position detection sensor 314 and a descended position detection sensor 315 as detection units for detecting a present position of the document tray 30 to control in lifting and lowering the document tray 30. The ascended position detection sensor 314 detects that an upper surface of a document bundle stacked on the document tray 30 is raised to a predetermined height where the document can be fed by the feed roller 1. A position (i.e., upper position) of the document tray 30 in a case where the upper surface of the document bundle is located at the predetermined height will be referred to as an "ascended position" hereinafter. The descended position detection sensor 315 detects that the document tray 30 is located at a position where the document tray 30 stands by in a case where the ADF 200 conveys no document. This position (i.e., lower position) will be referred to as a "descended position" hereinafter. The ascended position is a first position in the present embodiment and the descended position is a second position in the present embodiment.

As the feed roller 1 and the separation roller 2 are driven by the feed motor 310 in a state in which the document tray 30 is located at the ascended position, the document is fed one by one from the document tray 30. Meanwhile, in a case where the document tray 30 is located at the descended position, the document on the document tray 30 does not contact with the feed roller 1 and hence the document is not fed.

The reader CPU 301 is also connected with the conveyance system sensors including the separation sensor 11, the pull-out sensor 12, the conveyance sensor 13, the read sensor 14, and the discharge sensor 15 provided at the respective places of the conveyance path. Based on detection signals of the conveyance system sensors, the reader CPU 301 judges whether a conveyance operation of the document being conveyed is normally in progress.

Still further, in order to realize an image reading function, the reader CPU 301 is connected with the front and rear LEDs 103a, 103b, 203a and 203b, the front and rear reading sensors 108 and 208, an image processing portion 304, and an image memory 305. The reader CPU 301 stores image data read by line sensors (i.e., the front and rear reading sensors 108 and 208) in the image memory 305 after implementing various image processing by the image processing portion 304. An example of the image processing is a shading correction of correcting brightness and other of the image data of this time based on read data of white reference plates 110 and 210 in FIG. 4 read in advance by the front surface reading portion 105 and the rear surface reading portion 202.

The reader CPU 301 transmits the image data stored in the image memory 305 to a system controller 400 via an image data bus 318 corresponding to an image output request received from the system controller 400 via a command data bus 317. The reader CPU 301 also notifies a vertical synchronizing signal which is a reference of a leading edge of document image data and a horizontal synchronizing signal which is a reference of a leading edge of one line of pixels to the system controller 400 through the image data bus 318 while adjusting with a document reading timing.

The system controller 400 includes a system CPU 411, a system ROM-B 412, and a system RAM-B 413 and exchanges data regarding image reading control with the reader CPU 301 through the command data bus 317. The image data processed by the image processing portion 304 of the image reading apparatus is transferred to an image processing unit 414 within the system controller 400 through the image data bus 318 and is stored within an image memory 415 after a predetermined image processing such as color determination. The system controller 400 also includes an operating unit 416, and the system CPU 411 executes interface control to communicate with a user through the operating unit 416. The operating unit 416 includes a display unit such as a liquid crystal panel that displays information by an image and an input unit that is composed of physical buttons or a touch panel function portion of the liquid crystal panel that receives input operations from the user.

Note that the system controller 400 functions as a control unit that integrally controls the whole apparatus including the ADF 200 and the reader portion 100. For instance, in a case of the image forming apparatus 180 as illustrated in FIG. 4B, the system controller 400 may be a control board mounted in the image forming apparatus body 160. In this case, the system controller 400 can cause the image forming unit to execute image forming operations based on image information received from the reader controller 300. Still further, if the reader controller 300 is appropriately connected with the respective motors and sensors described above, the reader controller 300 may be provided outside of a casing of the ADF 200 or the reader portion 100 such as the image forming apparatus body.

Mixed Size Document Reading

Next, a size specifying method in a case of reading image information from different size documents will be described. This case will be referred to as "mixed size reading" hereinafter. The mixed size reading permits to stack a plurality of types of documents having different widths (i.e., dimensions in the width direction of the documents) and/or lengths (i.e., dimensions in the feed direction of the documents) together on the document tray 30.

In a case where the mixed size reading is not performed, e.g., in a case where only one type of standard size documents are set, the sizes of the documents can be determined by detecting a document width by the document width sensor 309 in FIG. 5 provided on the document tray 30 and by detecting a document length by using the separation sensor 11 after starting to convey the document. That is, it is possible to measure the document length based on an elapsed time since a leading edge of the current document is detected by the separation sensor 11 until a trail edge of the current document is detected by the separation sensor 11 and on a conveyance speed of the document by the separation roller 2 and the pull-out roller 3. Based on the discriminated document size, the reader CPU 301 stores image data read by the front surface reading portion 105 and the rear surface reading portion 202 by a necessary width, i.e., a range in a main scanning direction, and a necessary length, i.e., a range in a sub scanning direction, into the image memory 305.

However, in the case of the mixed size reading, because the side regulating plates 31a and 31b on the document tray 30 are positioned by being adjusted to a document having a largest width, the detection result of the document width sensor 309 does not reflect widths of other documents. Due to that, the document sizes are to be detected for each document by another means in the case of the mixed size reading to specify a range by which image data is obtained.

In the case of the mixed size reading, the document length is measured based on the detection result of the separation sensor 11 in the same manner with the case other than the mixed size reading described above. The document width is measured by implementing edge detection to primary image data read by the front surface reading portion 105. That is, the image processing portion 304 of the reader controller 300 analyzes the primary image data received from the front reading sensor 108 to specify both side edges, i.e., edge portions of the document in the width direction, and to calculate a distance between the side edges as a width of the document. Based on the document sizes specified as described above, the reader CPU 301 stores the image data read by the front surface reading portion 105 and the rear surface reading portion 202 by the necessary width (i.e., the range in the main scanning direction) and the necessary length (i.e., the range in the sub scanning direction) into the image memory 305.

Document Set Position on the Document Tray

Next, positions for setting documents onto the document tray 30 will be described for a case of the mixed size reading and for a case other than the mixed size reading.

Figure 6:
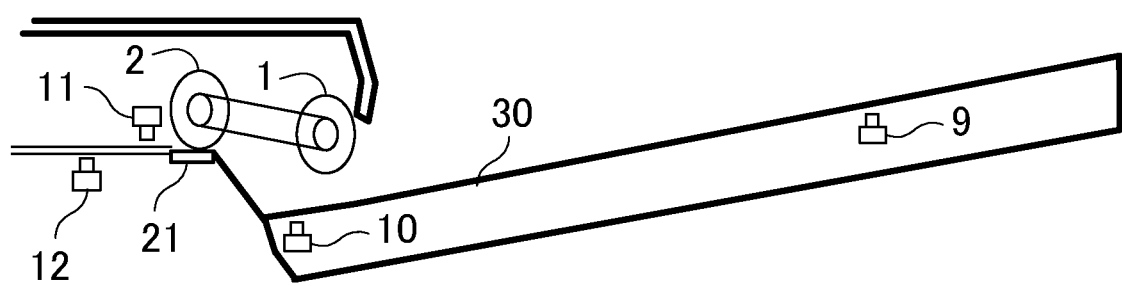
FIG. 6 is a section view illustrating a part of the image reading apparatus according to the first embodiment in a state in which a document tray is located at a descended position.
Figure 7:
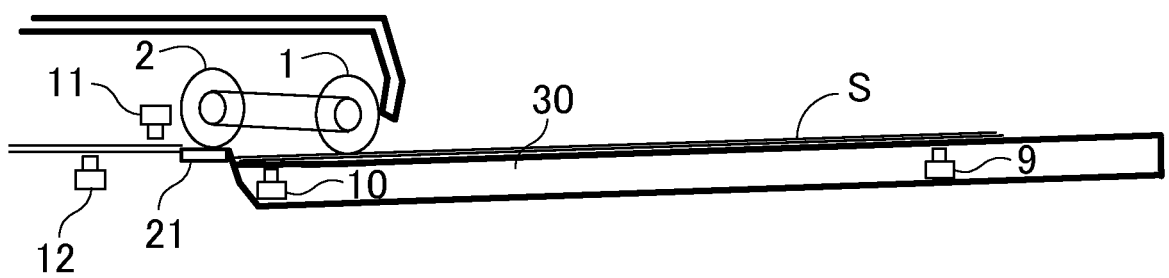
FIG. 7 is a section view illustrating the part of the image reading apparatus according to the first embodiment in a state in which the document tray is located at an ascended position.

In a case where the ADF 200 conveys no document, the document tray 30 stands by at the descended position as illustrated in FIG. 6. When a document bundle S is stacked on the document tray 30, a detection signal of the document presence/absence sensor 10 changes and then the reader CPU 301 judges that there is the document on the document tray 30, and starts to lift the document tray 30 by the tray lifting motor 312. Then, the lifting of the document tray 30 is finished as illustrated in FIG. 7 when the ascended position detection sensor 314 in FIG. 5 issues a detection signal indicating that the upper surface of the document bundle S has arrived at the predetermined height.

Because the document bundle S is in contact with the feed roller 1 in a state in which the document tray 30 is located at the ascended position, the document can be fed immediately by driving the feed roller 1 by the feed motor 310. That is, by moving the document tray 30 to the ascended position at a moment when the document is detected by the document presence/absence sensor 10, it is possible to shorten a standby time from when the user specifies to execute the reading operation to when the image data is obtained.

By the way, in a case other than the mixed size reading, the user manually adjusts positions of the side regulating plates 31a and 31b by adjusting the side regulating plates 31a and 31b with the document width when the document bundle S is stacked on the document tray 30. The reader CPU 301 uses a value obtained based on the detection result of the document width sensor 309 in executing the feeding reading operation as a width of the document stacked on the document tray 30.

Figure 1A:
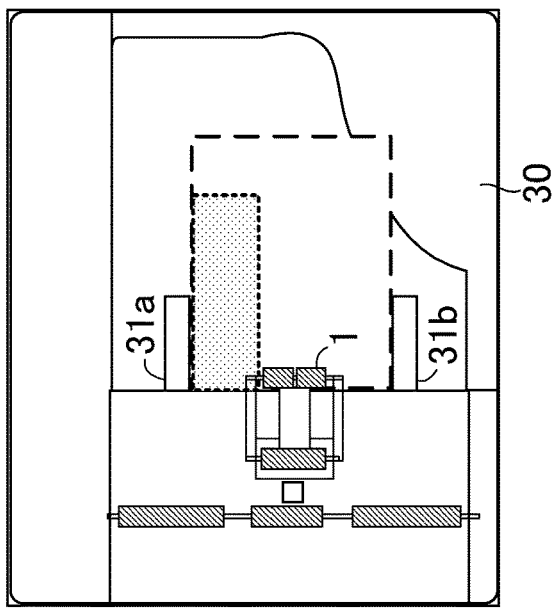
FIG. 1A illustrates a set position example of standard size documents.
Figure 1B:
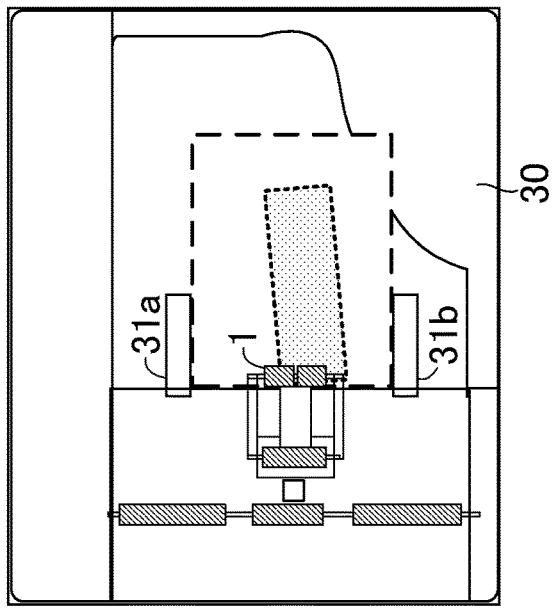
FIG. 1B illustrates a set position example of documents including a non-standard size document.
Figure 1C:
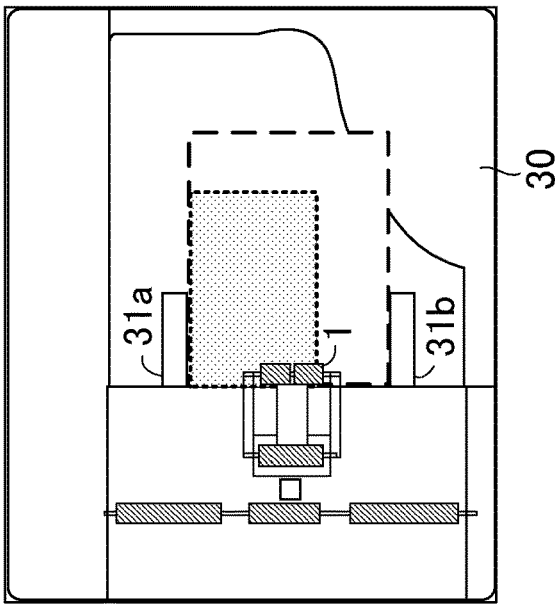
FIG. 1C illustrates a set position example of documents including a non-standard size document.

Meanwhile, there is a case where a plurality of different size documents is stacked on the document tray 30 in the case of the mixed size reading, and there is a case where a document having a very small width such as a non-standard size document is mixedly stacked together with the standard size document in particular. Due to that, in the case of the mixed size reading, the respective size documents are required to be set being adjusted on the center position of the document tray 30 in the width direction as illustrated in FIG. 1C, not on a one-sided position adjacent to one of the pair of the regulating plates 31a and 31b in the width direction as illustrated in FIG. 1B. The image reading apparatus 150 notifies the user of an appropriate document setting position through the operating unit 416 in FIG. 5 for example. Here, in a case where the center position of the feed roller 1 is different from the center position of the document tray 30, the documents of the respective sizes are set by adjusting positions of the documents on the center position of the feed roller 1.

Figure 1D:
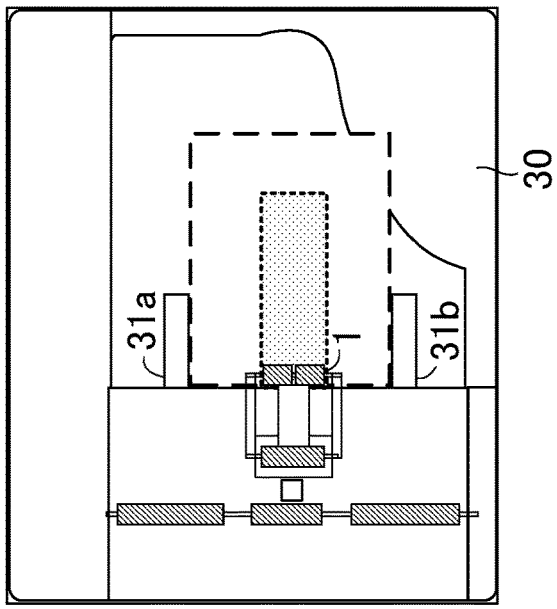
FIG. 1D illustrates a set position example of documents including a non-standard size document.
Figure 2:
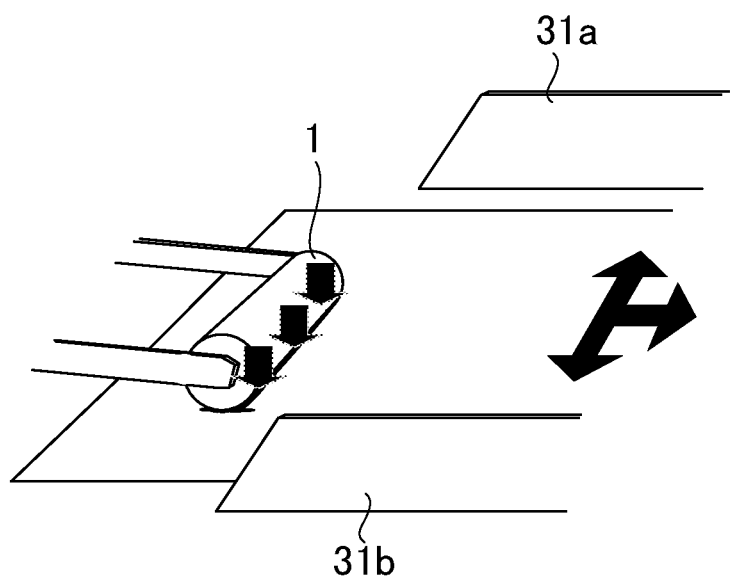
FIG. 2 illustrates a state in which a document is hard to be repositioned.

In a case where the document is set at a position separated from the side regulating plates 31a and 31b, a small document tends to tilt as illustrated in FIG. 1D, and the document needs to be repositioned. However, the document bundle S is pressed by the feed roller 1 as illustrated in FIG. 2 and the document is hardly repositioned if the document tray 30 is moved to the ascended position at the moment when the document is detected by the document presence/absence sensor 10 as described above. Then, the present embodiment proposes to ease repositioning of mixed size documents by properly controlling the position of the document tray 30 in a mode of mixed size reading including non-standard size documents as described later.

Mixed Size Reading of Non-Standard Size Documents

A function of the mixed size reading including non-standard size in the present embodiment will be described with reference to FIGS. 8 through 11.

Figure 8:
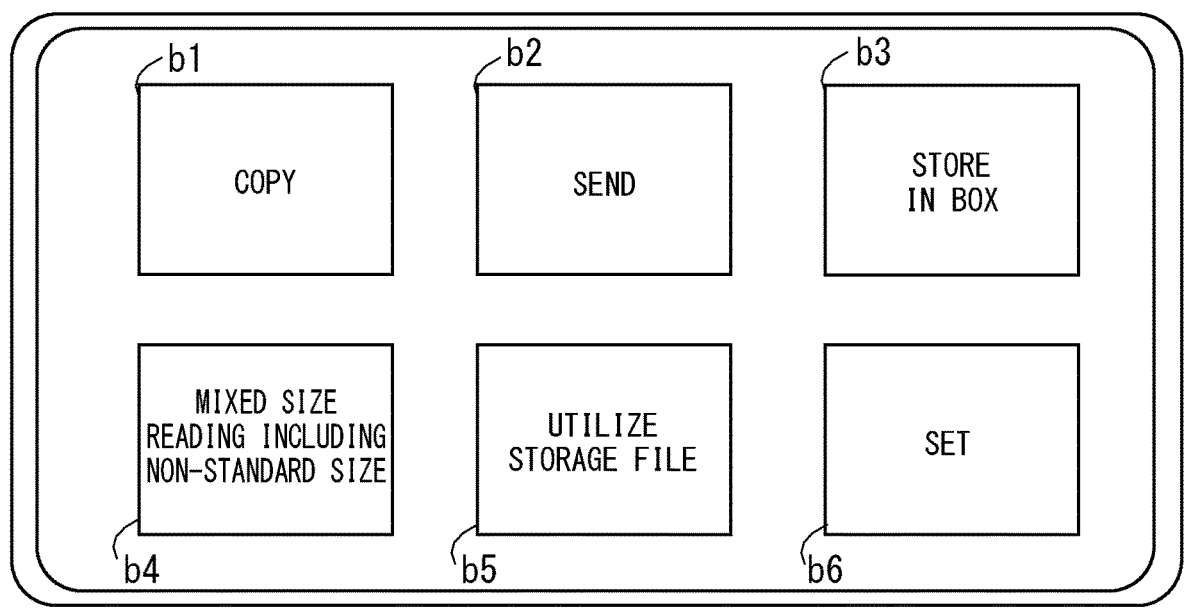
FIG. 8 illustrates a selection screen for selecting an operation mode of the image reading apparatus according to the first embodiment.

FIG. 8 illustrates a selection screen displayed on the operating unit 416 when no reading operation is performed after starting power of the image reading apparatus 150. Buttons b1 through b6 in FIG. 8 are parts that permit to select a function to be executed by the image reading apparatus 150 by touching the screen.

Figure 9:
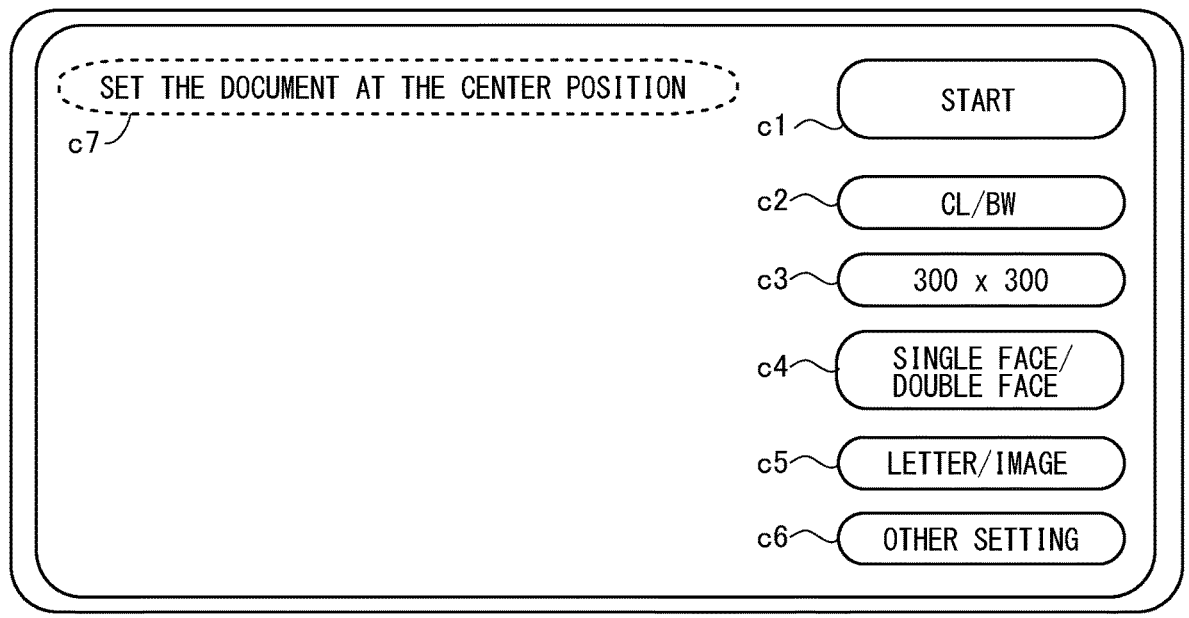
FIG. 9 illustrates a screen displayed in a case where reading of mixed size documents including non-standard size is selected in the selection screen in FIG. 8.

In a case of reading image information from mixed size documents including non-standard size documents, the user selects the button b4 of "MIXED SIZE READING INCLUDING NON-STANDARD SIZE". Then, the screen display of the operating unit 416 transits to an execution screen as illustrated in FIG. 9. The execution screen displays a button c1 for instructing to start the reading operation (i.e., to enter an instruction to start sheet feeding), buttons c2 through c6 for setting details of the reading operation and a message c7 informing the user of a document setting position. In the present embodiment, if the mode of the mixed size reading including non-standard size documents is selected, the message c7 instructing the user to position the documents on the center position of the document tray 30 is displayed.

In FIG. 8, the operations of the apparatus in a case where the button b4 of "MIXED SIZE READING INCLUDING NON-STANDARD SIZE" is selected is a first mode in the present embodiment. It is possible to execute a reading operation mode other than "MIXED SIZE READING INCLUDING NON-STANDARD SIZE" by selecting the button b1, b2, b3 and b5 in FIG. 8. In the modes other than "MIXED SIZE READING INCLUDING NON-STANDARD SIZE", the image reading apparatus is capable of execute a reading operation to read documents having an equal standard size and a mixed size reading operation to read documents having different sizes which include only standard sizes. The mixed size reading including only standard sizes is a mode in which a plurality of sheets supported on the supporting portion and having different standard sizes are fed by the feeding unit, and serves as a second mode of the present embodiment. Still further, in a case where the mode of mixed size reading including non-standard size is selected, the documents is set at the center position of the document tray 30 as illustrated in FIG. 1C. Meanwhile, in a case where a mode other than the mixed size reading including non-standard size is selected and the mixed size reading of standard size documents is to be executed, the documents are set on the one-sided position adjacent to the side regulating plate 31a as illustrated in FIG. 1A.

Note that the "standard size" in the present embodiment refers to sizes registered in advance in a storage portion such as the ROM-A 302 as sheet sizes often used for ordinary documents, and the "non-standard size" refers to any size other than the registered sizes. Accordingly, the non-standard size sheet includes a sheet having a widthwise length smaller than a least length of the standard size sheets.

Figure 10:
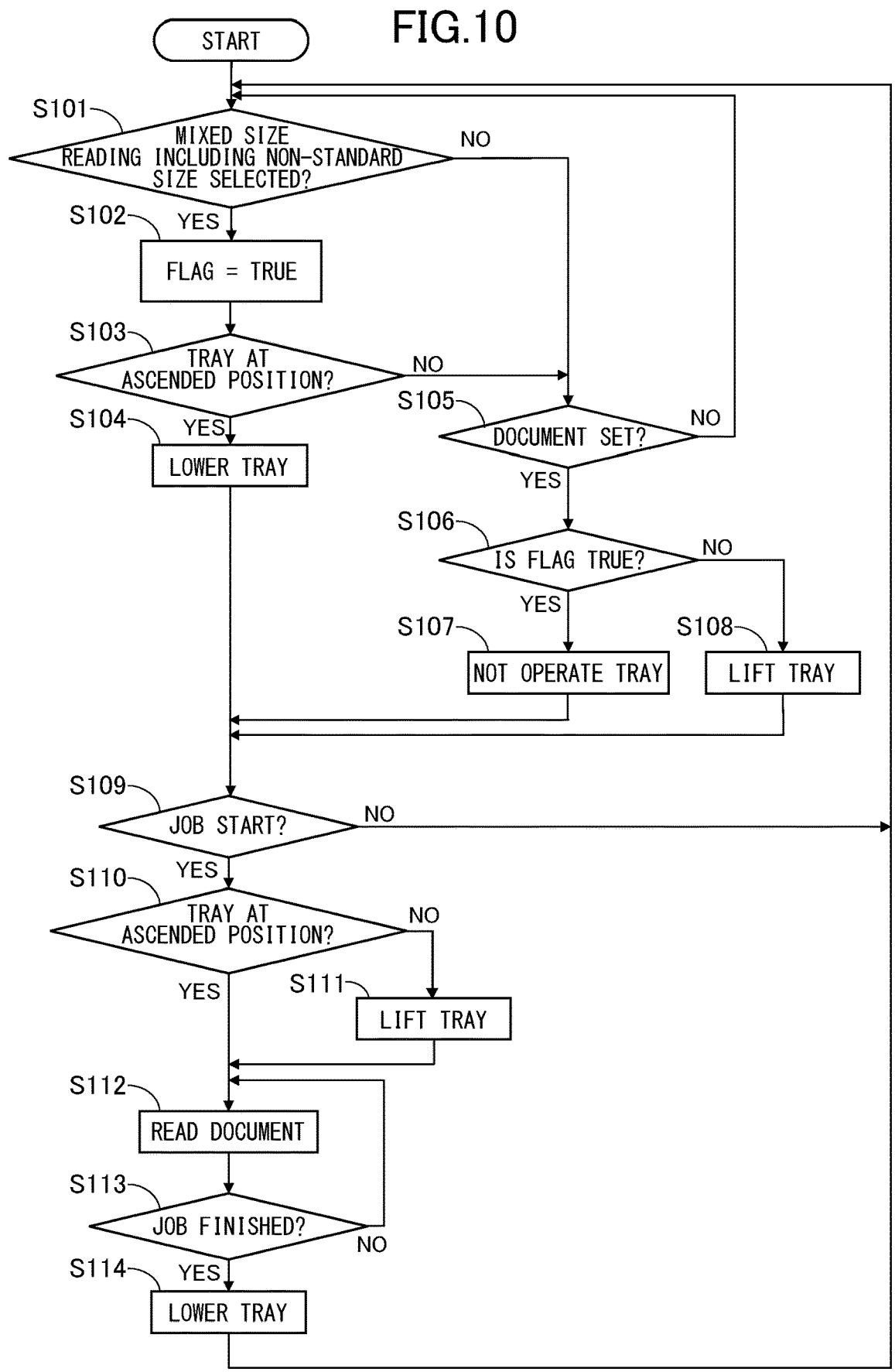
FIG. 10 is a flowchart illustrating a control method of the image reading apparatus according to the first embodiment.

FIG. 10 is a flowchart illustrating a control method of the image reading apparatus according to the present embodiment. Each step of the flow is realized by the reader CPU 301 that reads and executes the control program stored in the ROM-A 302.

After starting power supply to the image reading apparatus 150, the process of the flowchart is started and the selection screen in FIG. 8 is displayed on the operating unit 416. The reader CPU 301 monitors whether the button b4 of "MIXED SIZE READING INCLUDING NON-STANDARD SIZE" is selected in Step S101. In a case where the user selects "MIXED SIZE READING INCLUDING NON-STANDARD SIZE" through the operating unit 416, a notice (instruction) of executing the mixed size reading including non-standard size is transmitted from the system controller 400 to the reader controller 300 through the data bus 317. Receiving the notice (instruction), the reader CPU 301 changes a non-standard size document reading flag to TRUE in Step S102.

Next, the reader CPU 301 confirms whether the document presence/absence sensor 10 turns ON and the document tray 30 has moved to the ascended position in FIG. 7 until now in Step S103. In a case where the document tray 30 has moved to the ascended position, i.e., Yes in Step S103, the reader CPU 301 causes the document tray 30 to move to the descended position in FIG. 6 in Step S104.

That is, if the mode of mixed size reading including non-standard size is selected in a state in which the document tray 30 is located at the ascended position, a control of moving the document tray 30 from the ascended position to the descended position is made in the present embodiment. Thereby, the feed roller 1 does not come into contact with the document, so that the non-standard size document can be readily repositioned or added on the document tray 30 and the mixed size documents including the non-standard size documents can be easily set at a proper position. After moving the document tray 30 to the descended position, the reader CPU 301 stands by until the user instructs to start to read documents by pressing the button c1 in FIG. 9 of "START" to feed the document through the operating unit 416 in Step S109.

Meanwhile, in a case where the document tray 30 is located at the descended position in FIG. 6 when the user selects "MIXED SIZE READING INCLUDING NON-STANDARD SIZE", i.e., No in Step S103, the reader CPU 301 stands by until the documents are stacked while keeping the document tray 30 at the descended position in Step S105. In a case where the document presence/absence sensor 10 turns ON, i.e., Yes in Step S105, because of the documents newly stacked on the document tray 30 in this case, the reader CPU 301 confirms whether the mode of mixed size reading including non-standard size has been selected in Step S106. In a case where the mode of mixed size reading including non-standard size is selected, i.e., Yes in Step S106, the reader CPU 301 causes the document tray 30 to stay at the descended position without lifting the document tray 30 in Step S107.

Thereby, even if documents are stacked after selecting the mode of mixed size reading including non-standard size has been selected, the mixed size documents including non-standard size documents can be readily repositioned or added because the document tray 30 stays at the descended position.

Still further, in a case where the mode of mixed size reading including non-standard size is not selected when documents are stacked on the document tray 30, i.e., No in Step S101, Yes in Step S105 and No in Step S106, the reader CPU 301 causes the document tray 30 to move to the ascended position in Step S108. That is, in a case where the mode of mixed size reading including only standard sizes is selected, the reader CPU 301 causes the document tray 30 to move to the ascended position. Then, the reader CPU 301 stands by until the user selects to start reading through the operating unit 416 in Step S109.

When the user instructs to start reading, i.e., Yes in Step S109, the reader CPU 301 confirms whether the document tray 30 is located at the ascended position in Step S110. In a case where the document tray 30 is located at the ascended position at the moment when the user instructs to start reading, i.e., Yes in Step S110, the feed roller 1 and others are started to be driven while keeping the document tray 30 at the ascended position. Thereby, the documents stacked on the document tray 30 are fed one by one to read image information in Step S112.

Meanwhile, in a case where the document tray 30 is not located at the ascended position at the moment when the instruction of start reading is received, i.e., No in Step S110 and the document tray 30 is located at the descended position, the feed roller 1 and others are started to be driven after the document tray 30 is moved to the ascended position in Step S111. Then, the image information is read from the documents conveyed along the conveyance path within the ADF 200 in Step S112.

In a case where all of the documents stacked on the document tray 30 are conveyed and reading of image information is finished, i.e., Yes in Step S113, the reader CPU 301 causes the document tray 30 to move to the descended position in Step S114 to return to Step S101 to continue the process.

By the control in accordance with the flowchart described above, the mixed size documents including non-standard size documents can be set more easily, because in a case where the mode of mixed size reading including non-standard size, the document tray 30 stays at the descended position until start reading is instructed.

First Modified Example

While the document tray 30 is lowered in synchronism with the transition of the operating unit 416 from the selection screen in FIG. 8 for selecting the reading operation mode to the execution screen in FIG. 9 of the mixed size reading including non-standard size, the transition of the screen needs not to be always synchronized with lowering of the document tray 30. For instance, in a case where the button b4 of the mixed size reading including non-standard size is pressed in the selection screen and in a case where the display of the selection screen is continued by indicating a selection result by changing a color of the button b4, the document tray 30 may be lowered in response to pressing of the button b4.

Second Modified Example

While the abovementioned embodiment has been described as such that the position of the document tray 30 in the standby state is set at the descended position in a case where the mode of the mixed size reading including non-standard size, which serves as the first mode, is selected. However, even in a case where the mixed size documents only including the standard sizes are used, the problem described by using FIGS. 1A through 1D may occur when the widths of the documents are largely different from each other. Accordingly, the similar control with the abovementioned embodiment may be applied also to the mode of the mixed size reading including only standard sizes for example.

Second Embodiment

An example in which a position where the document tray 30 stands by in a case where the mode of the mixed size reading including non-standard size is selected is set at a position other than the descended position will be described as a second embodiment. Note that elements denoted by reference signs common with those of the first embodiment will be assumed to have substantially the same configurations and operations, and parts different from the first embodiment will be mainly described below.

Figure 11:
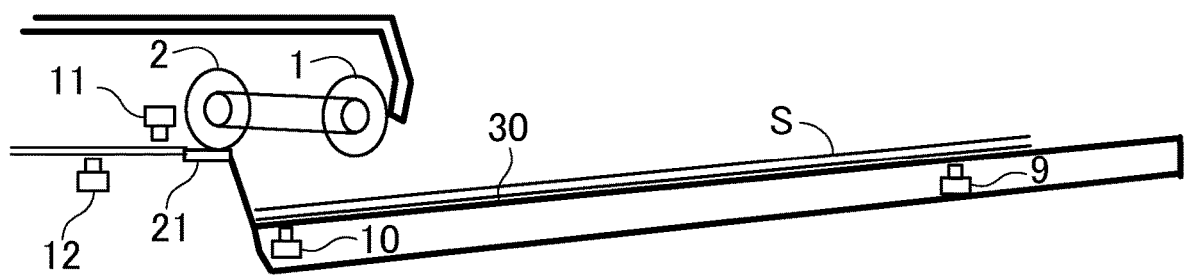
FIG. 11 is a section view illustrating a part of the image reading apparatus according to the first embodiment in a state in which the document tray is located at a standby position.

FIG. 11 illustrates a standby position where the document tray 30 stands by until a reading operation is started in a case where the mode of the mixed size reading including non-standard size is selected in the present embodiment. The standby position of the document tray 30 of the present embodiment is located at a specific position between the ascended position and the descended position. In other words, when the ascended position is the first position and the descended position is the second position, the standby position of the present embodiment is a third position between the first position and the second position. The standby position is a position where the document bundle S on the document tray 30 does not come into contact with the feed roller 1, i.e., a position where the ascended position detection sensor 314 in FIG. 5 is turned OFF. The standby position is also a position above the descended position which is a lower limit position of a movable range of the document tray 30, i.e., a position where the descended position detection sensor 315 in FIG. 5 is turned OFF.

By arranging the document tray 30 to stand by at such standby position, a required time for moving the document tray 30 from the standby position to the ascended position becomes shorter than a time for moving the document tray 30 from the descended position to the ascended position in a case where the instruction to start reading is given. That is, this arrangement makes it possible to shorten a waiting time from when the instruction to start reading is given to when a first document is fed as compared to the first embodiment that causes the document tray 30 to stand by at the descended position in the case where the mode of mixed size reading including only the standard sizes is selected. Meanwhile, because the upper surface of the document bundle S is not in contact with the feed roller 1 even in a state in which the document tray 30 is located at the standby position, mixed size documents including non-standard size documents are easily set in the same manner with the first embodiment.

Figure 12:
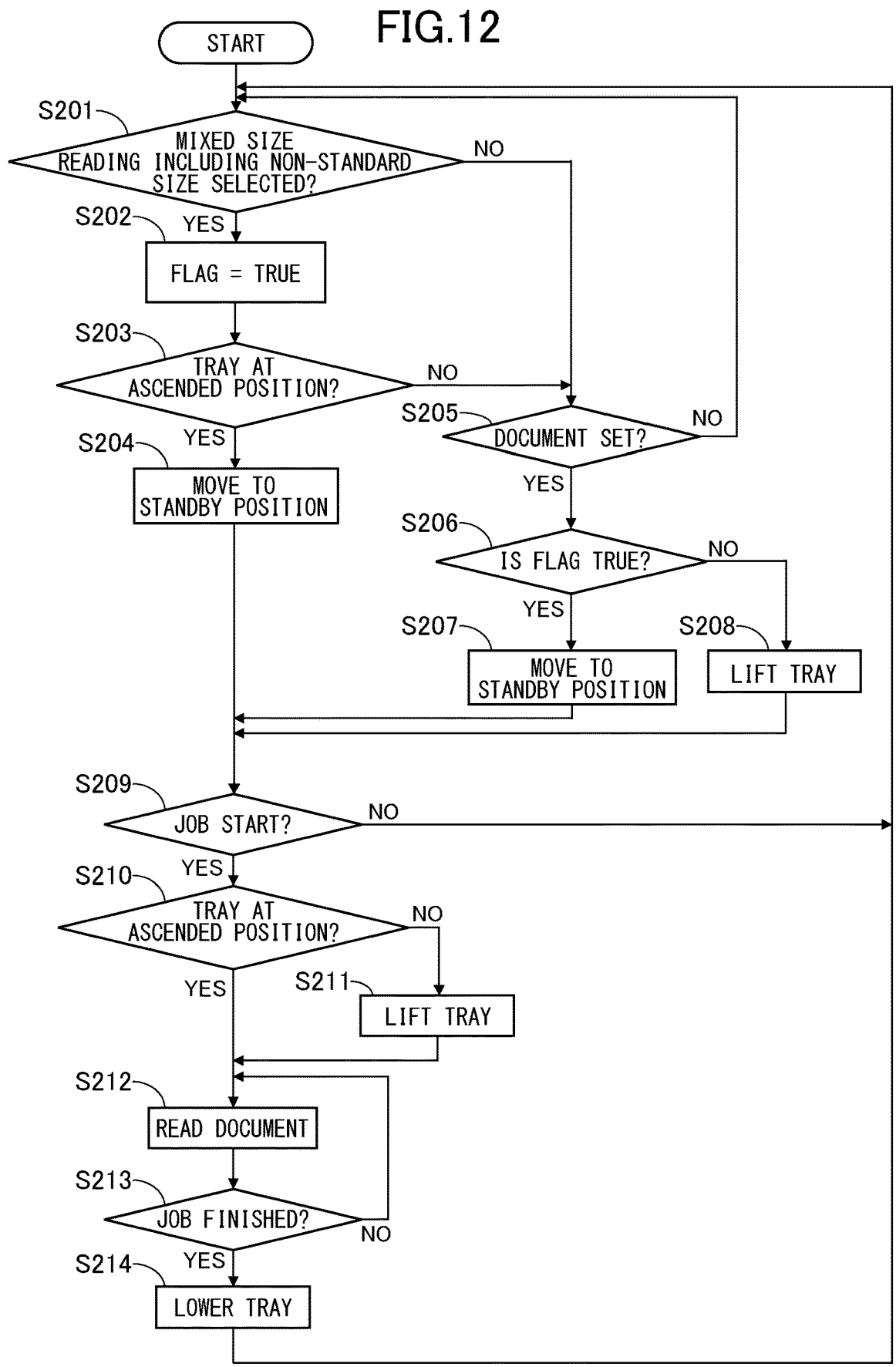
FIG. 12 is a flowchart illustrating a control method of an image reading apparatus according to a second embodiment.

FIG. 12 is a flowchart illustrating a control method of the image reading apparatus 150 according to the present embodiment. Each step of the flow is realized by the reader CPU 301 that reads and executes the control program stored in the ROM-A 302.

After starting power supply to the image reading apparatus 150, the process of the flowchart is started and the selection screen in FIG. 8 is displayed on the operating unit 416. The reader CPU 301 monitors whether the button b4 of "MIXED SIZE READING INCLUDING NON-STANDARD SIZE" is selected in Step S201. In a case where the user selects "MIXED SIZE READING INCLUDING NON-STANDARD SIZE" through the operating unit 416, a notice (instruction) of executing the mixed size reading including non-standard size is transmitted from the system controller 400 to the reader controller 300 through the data bus 317. Receiving the notice (instruction), the reader CPU 301 changes a non-standard size document reading flag to TRUE in Step S202.

Next, the reader CPU 301 confirms whether the document presence/absence sensor 10 turns ON and the document tray 30 has moved to the ascended position in FIG. 7 until now in Step S203. In a case where the document tray 30 has moved to the ascended position, i.e., Yes in Step S203, the reader CPU 301 causes the document tray 30 to move to the standby position in FIG. 11 in Step S204. Specifically, the reader CPU 301 causes the document tray 30 to start to lower by the tray lifting motor 312, continues to drive the tray lifting motor 312 by a predetermined pulse number after the ascended position detection sensor 314 in FIG. 5 has been turned OFF, and then stops to drive the tray lifting motor 312.

The document tray 30 moves to the standby position where the document bundle S would be separated by a predetermined distance from the feed roller 1 by the descending operation in Step S204. Thereby, the feed roller 1 is not in contact with the document, so that the non-standard size documents can be readily repositioned or added on the document tray 30 and the mixed size documents including non-standard size documents can be easily set on a proper position. After moving the document tray 30 to the standby position, the reader CPU 301 stands by until the user gives an instruction to start reading documents by pressing the button c1 in FIG. 9 through the operating unit 416 in Step S209.

Meanwhile, in a case where the document tray 30 is located at the descended position in FIG. 6 when the user selects "MIXED SIZE READING INCLUDING NON-STANDARD SIZE", i.e., No in Step S203, the reader CPU 301 stands by until the documents are stacked while keeping the document tray 30 at the descended position in Step S205. In a case where the document presence/absence sensor 10 turns ON, i.e., Yes in Step S205, because of the documents newly stacked on the document tray 30 in this case, the reader CPU 301 confirms whether the mode of mixed size reading including non-standard size is selected in Step S206. In a case where mode of mixed size reading including non-standard size is selected, i.e., Yes in Step S206, the reader CPU 301 causes the document tray 30 to move from the descended position to the standby position to cause it to stand by there in Step S207.

Thereby, even if documents are stacked after selecting the non-standard size mixed size reading mode, the mixed size documents including the non-standard size documents can be readily repositioned or added because the document tray 30 stops at the standby position without moving to the ascended position.

Still further, in a case where the mode of mixed size reading including non-standard size is not selected when documents are stacked on the document tray 30, i.e., No in Step S201, Yes in Step S205, and No in Step S206, the reader CPU 301 causes the document tray 30 to move to the ascended position in Step S208. Then, the reader CPU 301 stands by until the user selects to start reading through the operating unit 416 in Step S209.

When the user instructs to start reading, i.e., Yes in Step S209, the reader CPU 301 confirms whether the document tray 30 is located at the ascended position in Step S210. In a case where the document tray 30 is located at the ascended position at the moment when the user instructs to start reading, i.e., Yes in Step S210, the feed roller 1 and others start to be driven while keeping the document tray 30 at the ascended position. Thereby, the documents stacked on the document tray 30 are fed one by one to read image information in Step S212.

Meanwhile, in a case where the document tray 30 is not located at the ascended position at the moment when the instruction to start reading is received, i.e., No in Step S210, and the document tray 30 is located at the standby position or the descended position, the feed roller 1 and others are started to be driven after the document tray 30 is moved to the ascended position in Step S211. Then, the image information is read from the documents conveyed along the conveyance path within the ADF 200 in Step S212.

In a case where all of the documents stacked on the document tray 30 are conveyed and reading of image information is finished, i.e., Yes in Step S213, the reader CPU 301 causes the document tray 30 to lower from the ascended position to the descended position in Step S214 to return to Step S201 to continue the process.

By the control in accordance with the flowchart described above, the mixed size documents including the non-standard size documents can be set more easily, because in a case where the mode of mixed size reading including non-standard size, the document tray 30 stays at the standby position until start reading is instructed.

Modified Embodiments

The embodiment of the present disclosure is not limited to the embodiments described above, and an arrangement that enables to instruct mixed size reading including non-standard size from a screen of a personal computer by connecting the image reading apparatus to the personal computer for example.

Still further, it is possible to arrange so as to obtain a position of the document tray 30 by counting a driving pulse number of a stepper motor driving the lift mechanism for example, instead of detecting the position of the document tray 30 by the sensors 314 and 315 in the lift control of the document tray 30.

Still further, the ADF used in the image reading apparatus is one example of the sheet conveyance apparatus, and the abovementioned embodiment may be applied to a sheet conveyance apparatus of another use such as a feeding apparatus configured to feed a sheet serving as a recording material in the image forming apparatus body. Still further, the abovementioned embodiment can be applied to the ADF having only the document conveyance mechanism without a reading portion of image information such as the rear surface reading portion 202 in FIG. 4B within the ADF.

Other Embodiments

Embodiment(s) of the present invention can also be realized by a computer of a system or applying that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or applying by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-092282, filed on May 27, 2020, which is hereby incorporated by reference herein in its entirety.

What is claimed is:

1. A sheet conveyance apparatus comprising:
a supporting portion configured to support a sheet;
a detection unit configured to detect a sheet supported on the supporting portion;
a feeding unit disposed above the supporting portion and configured to feed a sheet supported on the supporting portion;
a lifting unit configured to lift and lower the supporting portion between a first position at which a sheet supported on the supporting portion abuts on the feeding unit and a second position below the first position; and
a control unit configured to control lifting and lowering of the supporting portion by the lifting unit,
wherein the control unit is configured to cause the lifting unit to move the supporting portion from the second position to a third position between the first position and the second position based on a detection of a sheet by the detection unit and to move the supporting portion from the third position to the first position based on an instruction to start sheet feeding.

2. The sheet conveyance apparatus according to claim 1, wherein the control unit is configured to execute a first mode and a second mode,
wherein in the first mode, the control unit causes the lifting unit to move the supporting portion from the second position to the third position based on the detection of a sheet by the detection unit and to move the supporting portion from the third position to the first position based on the instruction to start sheet feeding, and
wherein in the second mode, the control unit causes the lifting unit to move the supporting portion from the second position to the first position based on the detection of a sheet by the detection unit.

3. The sheet conveyance apparatus according to claim 2, wherein if the first mode is selected in a state where the supporting portion is located at the first position, the control unit causes the lifting unit to move the supporting portion to the third position.

4. The sheet conveyance apparatus according to claim 2, wherein the first mode is a mode in which a plurality of sheets including a sheet having a size different from standard sizes that are registered in advance in a storage portion of the sheet conveyance apparatus are to be fed.

5. The sheet conveyance apparatus according to claim 2, further comprising an operating unit configured to display a selection screen in which the first mode and the second mode are selectable.

6. The sheet conveyance apparatus according to claim 5, wherein in a case where the first mode is selected in the selection screen, the operating unit transits from the selection screen to an execution screen in which the instruction to start sheet feeding is entered,
wherein in a case where the first mode is selected in the selection screen in a state in which the supporting portion is located at the first position, the control unit causes the lifting unit to lower the supporting portion from the first position in response to a transition of the operating unit from the selection screen to the execution screen for executing the first mode.

7. The sheet conveyance apparatus according to claim 5, wherein the supporting portion is provided with a pair of regulating members that are movable in a width direction orthogonal to a feed direction of the feeding unit and configured to regulate positions of sheets supported on the supporting portion in the width direction, and
wherein in a case where the first mode is selected in the selection screen, the operating unit displays a notice instructing to adjust positions of sheets supported on the supporting portion to a center position in the width direction.

8. The sheet conveyance apparatus according to claim 2, wherein the supporting portion is provided with a pair of regulating members that are movable in a width direction orthogonal to a feed direction of the feeding unit and configured to regulate positions of sheets supported on the supporting portion in the width direction,
wherein the first mode is a mode in which a plurality of sheets having different sizes including a non-standard size are fed by the feeding unit in a state where the plurality of the sheets having the different sizes including the non-standard size are set on a center position of the supporting portion in the width direction, and
wherein the second mode is a mode in which the plurality of sheets having different standard sizes are fed by the feeding unit in a state where the plurality of the sheets having the different standard sizes are set on a one-sided position adjacent to one of the pair of the regulating members in the width direction.

9. The sheet conveyance apparatus according to claim 1, further comprising:
a position sensor configured to detect that the supporting portion is located at the first position,
wherein the third position is a position where the supporting portion is lowered by a predetermined distance from a position at which the position sensor changes from a detection state of detecting that the supporting portion is located at the first position to a non-detection state of detecting that the supporting portion is not located at the first position.

10. The sheet conveyance apparatus according to claim 1, wherein the control unit is configured to cause the lifting unit to move the supporting portion from the first position to the second position based on a detection of no sheet by the detection unit after the sheet feeding by the feeding unit is started.

11. An image reading apparatus comprising:
a supporting portion configured to support a sheet;
a detection unit configured to detect a sheet supported on the supporting portion;
a feeding unit disposed above the supporting portion and configured to feed a sheet supported on the supporting portion;
a lifting unit configured to lift and lower the supporting portion between a first position at which a sheet supported on the supporting portion abuts on the feeding unit and a second position below the first position;
a control unit configured to control lifting and lowering of the supporting portion by the lifting unit; and
a reading portion configured to read image information from a sheet fed by the feeding unit,
wherein the control unit is configured to cause the lifting unit to move the supporting portion from the second position to a third position between the first position and the second position based on a detection of a sheet by the detection unit and to move the supporting portion from the third position to the first position based on an instruction to start sheet feeding.

12. An image forming apparatus comprising:
a supporting portion configured to support a sheet;
a detection unit configured to detect a sheet supported on the supporting portion;
a feeding unit disposed above the supporting portion and configured to feed a sheet supported on the supporting portion;
a lifting unit configured to lift and lower the supporting portion between a first position at which a sheet supported on the supporting portion abuts on the feeding unit and a second position below the first position;
a control unit configured to control lifting and lowering of the supporting portion by the lifting unit;
a reading portion configured to read image information from a sheet fed by the feeding unit; and
an image forming portion configured to form an image on a recording material based on the image information read by the reading portion,
wherein the control unit is configured to cause the lifting unit to move the supporting portion from the second position to a third position between the first position and the second position based on a detection of a sheet by the detection unit and to move the supporting portion from the third position to the first position based on an instruction to start sheet feeding.

* * * * *